United States Patent [19]

Hagerty

[11] Patent Number: 5,477,504

[45] Date of Patent: Dec. 19, 1995

[54] BALANCED, DOUBLE-SIDED CALIBRATION CIRCUIT FOR SENSOR ELEMENT AND DIFFERENTIAL PREAMPLIFIER

[75] Inventor: James D. Hagerty, Tiverton, R.I.

[73] Assignee: The United States of America as represented by the Secretary of the Navy, Washington, D.C.

[21] Appl. No.: 319,709

[22] Filed: Oct. 7, 1994

[51] Int. Cl.$^6$ ................................................ H04B 17/00
[52] U.S. Cl. ...................... 367/13; 367/135; 340/853.2; 73/1 R; 73/1 DV; 330/258
[58] Field of Search ................ 367/13, 135; 340/853.2; 342/165; 73/1 R, 4 R, 1 DV; 330/2, 258, 260

[56] References Cited

U.S. PATENT DOCUMENTS

| | | | |
|---|---|---|---|
| 4,445,206 | 4/1984 | Audenard | 367/13 |
| 4,689,578 | 8/1987 | Spychalski | 330/2 |
| 4,972,381 | 11/1990 | Mitchell et al. | 367/13 |

Primary Examiner—J. Woodrow Eldred
Attorney, Agent, or Firm—Michael J. McGowan; James M. Kasischke; Prithvi C. Lall

[57] ABSTRACT

The balanced, bi-directional calibration circuit of the present invention is joined to a sensor and a differential preamplifier. The sensor has two outputs which are received by the differential preamplifier such that common-mode line noise is rejected. The calibration circuit includes a broadband signal generator which provides the calibration signal. The calibration circuit also includes a switching network that allows the calibration signal to be switched to either of the two sensor outputs or isolated from the sensor and preamplifier. A dual-state switching control signal is applied via a single control wire to the switching network to select which preamplifier input receives the calibration signal. The calibration signal generator control line is electrically isolated from the preamplifier by an opto-isolator. The electrical balance of the bi-directional calibration circuit and electrical isolation of the calibration signal generator preserve the common-mode noise rejection of the differential preamplifier.

18 Claims, 3 Drawing Sheets

BALANCED, DOUBLE-SIDED CALIBRATION CIRCUIT FOR SENSOR ELEMENT AND DIFFERENTIAL PREAMPLIFIER

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This invention is related to co-pending application entitled DIFFERENTIAL PRE-AMPLIFIER AND PRE-EMPHASIS NETWORK, Ser. No. 08/319,688, in the name of the same inventor as this invention, filed on even date herewith, and fully incorporated herein by reference.

BACKGROUND OF THE INVENTION

1. Field of the Invention

This invention is related to the field of sensor calibration and more particularly, to a differential sensor pre-amplifier with a balanced, bi-directional calibration circuit.

2. Description of the Prior Art

Differential amplifiers are extremely useful in low-noise telemetry work because common-mode noise picked up on the input lines is canceled out by common-mode rejection. Underwater hydrophone amplifiers, however, are typically single-ended at the input because of the difficulty of injecting balanced calibration signals, while single-ended amplifiers provide only one equivalent noise source at the amplifier input.

In a typical prior art single-ended hydrophone amplifier circuit, a broadband calibration signal is applied through a series arrangement of a hydrophone element and a calibration attenuation network to only one input of an operational amplifier, the other input of the operational network being connected to signal ground. The attenuation network prevents saturation of the single-ended operational amplifier, and the injection of the calibration signal in series with the hydrophone element allows the user to verify that the hydrophone element is intact and that the rest of the electronics in the signal processing chain is working properly.

The calibration signal is usually a high-bandwidth waveform containing many tones at discrete frequencies. Injecting such a signal at the hydrophone input allows the user to verify that the hydrophone capacitive element is intact and that the rest of the electronics in the signal chain is working properly. Knowing the levels of each input calibration tone allows the user to perform a system calibration. Then, knowing the hydrophone sensitivity will enable the operator to record a precise amplitude measurement of in-water signals. The calibration signal is also a valuable way of quickly verifying system operation.

For example, as shown in FIG. 1, generally designated at 10 is a schematic circuit diagram of a typical, prior art single-ended hydrophone preamplifier with a single-ended calibration circuit. Circuit 10 includes a unidirectional hydrophone calibration circuit shown generally in dashed box 12 and a single-ended preamplifier shown generally in dashed box 14. The calibration circuit 12 and preamplifier 14, as discussed more fully below, are inherently unbalanced and do not allow calibration of the common-mode rejection feature of the hydrophone.

In the prior-art calibration circuitry, a hydrophone 16 includes positive and negative hydrophone input paths 1 and 2 respectively. Positive hydrophone input path 1 is connected to the non-inverting input of operational amplifier (op amp) 18 and negative input path 2 is connected via resistor 11 to signal ground 20. The hydrophone 16 includes a shield 3, which in turn is connected to signal ground 20.

The prior art calibration circuitry includes an input 4 and return output 5. Calibration output 5 and the calibration return signal applied thereto are connected to signal ground 20 while the calibration input 4 is applied through a resistor 13 to the hydrophone negative input 2. One end of resistor 15 is connected to the hydrophone positive input 1 and the non-inverting input 17 of op amp 18. The other end is connected to signal ground 20. Use of the resistor 15, typically called the hydrophone termination resistor, is well-known to those skilled in the art.

The preamplifier 14 provides amplification of hydrophone input signals and roll off of unwanted low-frequency noise. Resistor 19 and capacitors 21 and 23 are connected between the inverting input 26 of the op amp 18 and signal ground 20. As is well known in the art, op amp 18 can be provided with gain shaping, surge protection and other circuitry, as well as with downstream amplifiers, filtering and other stages of amplification. Additional stages of amplification are not illustrated since they have no bearing on the present invention.

In use for calibration, a broadband noise signal is applied to calibration input 4 and output 5 through the resistor divider network 11 and 13, unidirectionally through the hydrophone 16, and into the non-inverting input 17 of the op amp 18. The amplified output signal 25 of the preamplifier stage 14 is used to verify the electrical continuity of the hydrophone 16. However, the single-ended calibration circuit 12 unbalances the amplifier, and moreover, it enables the user to check the continuity of the hydrophone 16 in one electrical direction but not bi-directionally.

Because the calibration signal and the attenuation network are connected to only one input of the op amp, the calibration circuit is inherently unbalanced and could destroy any common-mode noise rejection should the amplifier be operated in its differential mode. The calibration signal can also be injected directly at the single-ended output of the amplifier, e.g. by using an analog switch; however, the user has no way of directly verifying the integrity of the hydrophone capacitive element at the input.

Operational amplifiers operating in the differential mode are extremely useful in low-noise telemetry work because common-mode noise picked up on the input lines is cancelled out by common-mode rejection. A differential-input hydrophone preamplifier with self-calibration is disclosed by Spychalski in U.S. Pat. No. 4,689,578. It includes a calibration circuit for feeding a calibration signal into one amplifier of a pair of amplifier stages that form a balanced differential input charge preamplifier at a circuit point downstream of the hydrophone element.

The gain of the balanced differential-input charge preamplifier is dependent on the capacitance of the hydrophone. The calibration circuit enables the user to calibrate the combined hydrophone/preamplifier system in situ for variation in hydrophone capacitance caused by the changing operational depth when deployed in a marine environment. However, since the calibration signal is injected downstream of the hydrophone element, there is no direct checking of the continuity of the hydrophone element itself apart from the combined hydrophone/preamplifier system. Since Spychalski injects the calibration signal downstream of the hydrophone, it does not teach providing a balanced calibration signal at the front end or input of the differential amplifier to measure the common-mode rejection capabilities of the amplifier.

SUMMARY OF THE INVENTION

A first object of the present invention is to provide a calibration circuit for a sensor, such as a hydrophone, and a differential amplifier assembly.

Another object of the present invention is that the calibration circuit preserve balance between inputs to the differential amplifier when not engaged.

Yet another object of the present invention is that it selectably calibrate each side of the sensor and differential amplifier while preserving the common-mode rejection feature of the amplifier.

The balanced, bi-directional calibration circuit of the present invention is joined to a sensor, such as a hydrophone, and to a differential preamplifier. The sensor has two outputs which are received by the differential preamplifier such that common-mode line noise is rejected. The calibration circuit includes a broadband noise generator which provides the calibration signal. The calibration circuit also includes a switching means that allows the calibration signal to be switched to either of the two sensor outputs or isolated from the sensor and preamplifier.

In the preferred embodiment, the switching means includes hermetically sealed reed relays whose ON contact resistance is essentially zero and whose OFF contact resistance between contacts is essentially infinite. The switching means is responsive to first and second states of a two-state switching control signal applied to the switching means. In this manner, only a single control wire is required to effect switching between normal operating mode, calibration of a first sensor side, and calibration of a second sensor side. In a further feature of the present invention, means are disclosed for balancing the switching means and calibration circuit so as to preserve common-mode rejection by maintaining a balanced circuit. In the preferred embodiment, the reed relays of the switching means are electrically connected to the broadband noise generator, the hydrophone and to the differential amplifier input by a plurality of wires which are selected to be as short as possible and to be identical in length to preserve the balance of the calibration circuit.

In yet another feature of the present invention, means are disclosed for electrically isolating the broadband noise generator from the differential input op amp when it is not being used for calibration purposes. In the preferred embodiment, the isolation means includes an opto-isolated switch which supplies power to the broad band noise generator and which decouples the noise generator from the differential-input op amp signal ground connections. The opto-isolation and practically infinite input impedance exhibited by the reed relays in the OFF state cooperate to provide excellent isolation and preservation of differential common-mode noise rejection when the broadband noise generator is turned off. In this manner, the balanced, bi-directional calibration circuit is essentially transparent to the op amp during normal operation.

BRIEF DESCRIPTION OF THE DRAWINGS

These and other objects and features of the present invention will become apparent to those skilled in the art by reference to the following detailed description of the preferred embodiment and to the drawings, wherein.

DESCRIPTION OF THE PREFERRED EMBODIMENT

Figure 1:
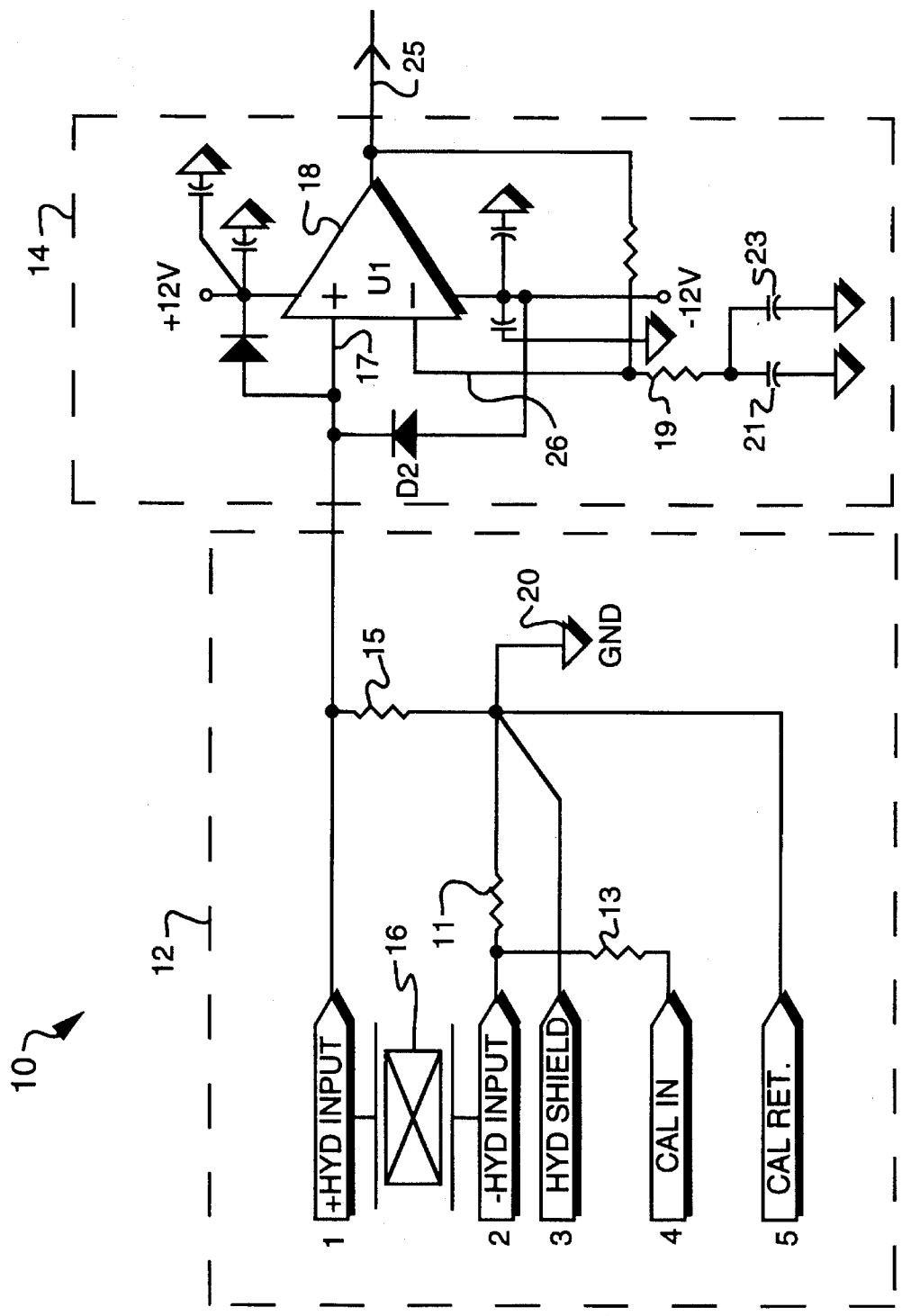
FIG. 1 is a schematic circuit diagram illustrating a typical single-ended, hydrophone calibration circuit of the prior art.
Figure 2:
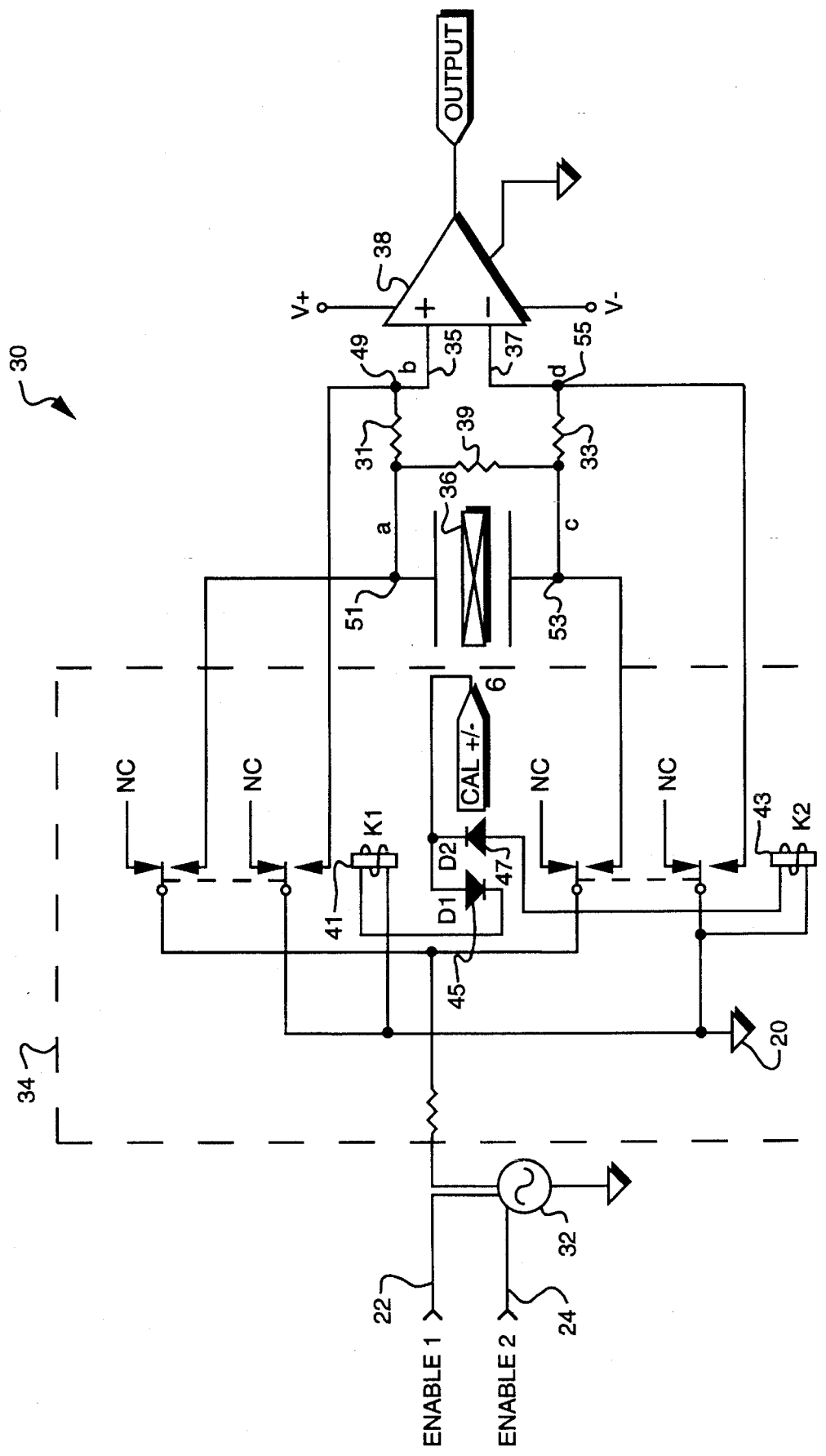
FIG. 2 is a schematic circuit diagram illustrating the differential sensor preamplifier with a balanced, bi-directional calibration circuit in accordance with the present invention.

The novel, balanced differential, amplifier calibration circuit in accordance with the present invention as embodied in a hydrophone preamplifier is shown generally at 30 in FIG. 2. Although the preferred embodiment shows a hydrophone as the sensor it is understood that this invention can be applied to any sensor having inverting and non-inverting outputs. A broadband calibration signal generator 32 enabled by first and second enable inputs 22, 24, is switched by a balanced, bi-directional switching network illustrated by dashed box 34 to either side of a hydrophone element 36. Each side of the hydrophone 36, in turn, is connected via series resistors 31 and 33 to the non-inverting 35 and inverting 37 inputs respectively of the differential operational amplifier 38. A hydrophone terminating resistor 39 is connected across the hydrophone 36.

In the preferred embodiment, the balanced, bi-directional switching network 34 which is a feature of the present invention includes first and second double pole, double throw, reed relays marked 41 and 43, whose contacts exhibit a substantially infinite impedance when opened, a substantially zero impedance when closed and are free from excessive high-frequency leakage. Other types of switches and other switch arrangements may, of course, be employed so long as they preserve circuit balance and do not degrade the targeted low-noise floor of the preamplifier.

One pole of each of the double pole, double throw relays or switches 41 and 43 is connected between the calibration signal generator 32 and a respective end of the hydrophone 36. The other pole of each of the double pole, double throw relay 41 and 43 is connected between signal ground 20 and a respective one of the non-inverting input 35 and inverting input 37 of the differential operational amplifier 38.

A calibration control signal is applied at an input control line 6 to the relays 41 and 43 via respective back-to-back Schottky diodes 45 and 47. Depending on the state of the control signal applied, either but not both of the diodes 45, 47 will conduct and activate a corresponding one of the relays 41 and 43. Calibration generator 32 will then be electrically connected to allow calibration of differential amplifier 38 and hydrophone element 36 using only single input control line 6.

When relay 41 is energized by a positive voltage calibration control signal, point "b" 49 is connected to signal ground 20 and point "a" 51 is energized by the broadband calibration signal. If a negative voltage calibration control signal is applied on input control line 6 then relay 43 is energized, and the broadband calibration signal supplied by the generator 32 is applied at point "c" 53 with point "d" 55 connected to signal ground.

Calibration tests the continuity of the capacitive element in hydrophone 36. Testing in both directions tests circuit balance. When the readings from both sides match, electrical balance of the differential amplifier input is indicated. If one of the readings is not the same as the other, then circuit balance has been disturbed, and corrective measures may be taken to restore circuit balance and common-mode noise rejection.

To minimize noise pickup, the wires running from relays 41, 43 to points 51, 49, 53, 55 should be as short as possible and identical in length to preserve the balance of the input circuit. In the preferred embodiment, relays 41 and 43 are encapsulated, double pole, double throw (DPDT) relays, such as the Clare PRMA2A05B, the Gordos 832A-2 and the Magnecraft W172DIP-21, all of which are commercially available.

If no signal is applied to relays 41, 43, for example if control line 6 is left open and if the calibration signal generator 32 is turned off in a manner to be described, the balanced, bi-directional calibration circuit is transparent to the op amp 38. The amplifier 38 then operates as a differential hydrophone preamplifier that exhibits excellent isolation and preservation of differential common-mode noise rejection.

Figure 3:
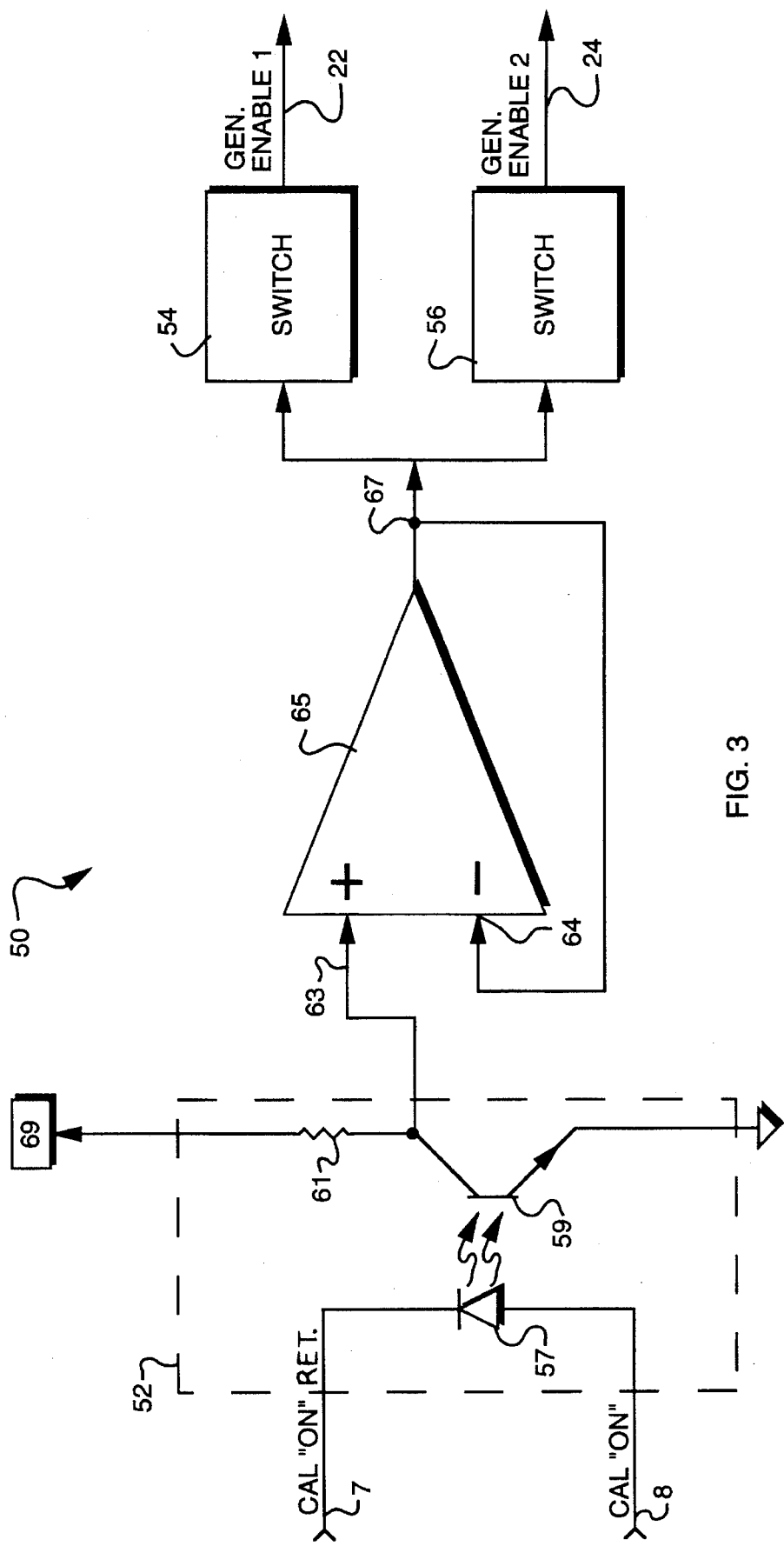
FIG. 3 is a schematic circuit diagram illustrating the circuit for electrical isolation of the calibration generator.

Referring now to FIG. 3, generally designated at 50 is a schematic circuit diagram of an opto-isolated circuit for turning the calibration signal generator 32 (FIG. 2) on and off according to another feature of the present invention. The circuit 50 includes an opto-isolator illustrated by dashed box 52 including a light emitting diode 57 and a photo-transistor 59. The light emitting diode 57 is connected through signal inputs marked 7 and 8 to a calibration generator on/off control signal source. The collector of photo-transistor 59 is connected through resistor 61 to a voltage supply 69 and its emitter is connected to ground. The advantage of the opto-isolator 52 is that it isolates the signal grounds on either side of the opto-isolator 52 enabling the present invention to turn on and turn off the calibration signal generator 32 (FIG. 2) without electrically interfering with the other components of the preamplifier.

The collector of photo-transistor 59 is connected to the non-inverting input 63 of a unity gain impedance buffer 65. An output 67 of the buffer 65 is connected to an inverting input 64 of the buffer 65. The output 67 of the impedance buffer 65 is connected to the control inputs of first and second solid state relays 54 and 56. The impedance buffer prevents the relays 54, 56 from acting as a voltage divider.

In operation, when a calibration "on" signal is applied to the inputs 7 and 8, the light emitting diode 57 turns on; the resulting light turns photo transistor 59 on. Photo-transistor 59 saturates and connects the non-inverting input 63 of the impedance buffer 65 to ground, energizing the solid state relays 54, 56, to activate the broadband signal generator 32.

In a similar manner, when the "cal on" control signal applied to inputs 7 and 8 is removed, the light emitting diode 57 is deactivated, photo-transistor 59 turns off, and the supply voltage 69 is applied to the non-inverting input of the impedance buffer 65. The output voltage of the buffer 65 is likewise brought high, which de-energizes the solid state relays 54, 56, thereby deactivating the power supply to signal generator 32.

Accordingly, the present invention provides a highly effective and efficient differential sensor pre-amplifier with a balanced, bi-directional calibration circuit. The present invention also provides for isolating the calibration signal generator when not in use.

Many modifications of the presently disclosed invention will become apparent to those skilled in the art without departing from the scope of the appended claims.

What is claimed is:
1. A differential preamplifier calibration circuit for a sensor comprising:
   a calibration signal generator having a calibration signal output;
   a switching means electrically connected to said calibration signal output having bi-directional outputs;
   a differential preamplifier including inverting and non-inverting inputs and having common-mode noise rejection between said inputs;
   said sensor having first and second terminals, said first terminal connected to said non-inverting input of said differential preamplifier and said second terminal connected to said inverting input of said differential amplifier; and
   said switching means outputs being selectably electrically joined to said first terminal and to said second terminal of said sensor for controllably switching a calibration signal from said calibration signal output from one of said first and second terminals of said sensor element to the other of said first and second terminals, said switching means further allowing said calibration signal output to be isolated from said sensor.

2. The circuit of claim 1 wherein said sensor is a hydrophone.

3. The circuit of claim 1 further comprising an isolated switching means coupled to said calibration signal generator, for turning said calibration signal generator on and off.

4. The circuit of claim 3 wherein said isolated switching means comprises an opto-isolator circuit having calibration switch inputs and buffered outputs, said outputs joined to said calibration signal generator.

5. The circuit of claim 1 wherein said calibration signal generator having said calibration signal output is a broadband noise generator providing a broadband noise signal.

6. The circuit of claim 1 wherein said switching means includes at least one reed relay that has generally zero "on" resistance and generally infinite "off" impedance.

7. The circuit of claim 1 wherein said switching means is responsive to a three-state switching control signal to controllably switch said calibration signal from one of said first and second terminals of said sensor to the other of said first and second terminals of said sensor, and to a state in which said calibration signal output is isolated from said sensor.

8. The circuit of claim 1 wherein said switching means is balanced by including first and second switches, each of said first and second switches connected by a plurality of signal paths, a first end of said plurality of signal paths coupled to said calibration signal source and a second end of said plurality of signal paths coupled to said sensor element and said differential amplifier, wherein pairs of signal paths of said plurality of signal paths are selected to be as short as possible and of equal length.

9. The circuit of claim 8 wherein each said first and second switches is a double pole, double throw relay.

10. A balanced preamplifier with calibration comprising:
    a calibration signal generator having a calibration signal output;
    a sensor having a first output and a second output, said first output providing a non-inverted signal and said second output providing an inverted signal;
    a differential amplifier having an output and a non-inverting first input and an inverting second input, said first input being connected to said sensor first output and said second input being connected to said sensor second output, said amplifier output providing a signal responsive to the difference between said amplifier inputs; and at least two switching devices joined to said calibration signal output and to said differential amplifier first input and second input having a high impedance value when not activated to allow said calibration signal output to be isolated from said amplifier.

11. A device as in claim 10 wherein said sensor is a hydrophone.

12. A device as in claim 10 further comprising:

series resistors connected between said non-inverting sensor output and amplifier input and between said inverting sensor output and amplifier input; and a sensor terminating resistor connected between said sensor outputs;

said switching devices being double throw switching devices each having two switching portions, one said switching portion joined between said calibration generator output and one said sensor output for controlling input of said calibration signal to said sensor output, said other switching portion joined between ground and one said amplifier input, one said switching device joined to the non-inverting side of the sensor and amplifier combination and the other switching device joined to the inverting side of the sensor.

13. A device as in claim 12 wherein said device is balanced by providing said series resistors having substantially the same impedance, said switching devices having substantially the same impedance, and connections between elements joined to said inverting preamplifier input having substantially the same impedance as elements joined to said non-inverting preamplifier input.

14. A device as in claim 12 wherein said at least two switching devices are two double pole double throw relays, each said relay having a coil and two switching portions.

15. A device as in claim 14 further comprising:

a control signal input providing a control signal, said control signal having positive, negative and null states;

a first diode joined between said control signal input and a coil of a first said double pole double throw relay, said diode being biased against said positive control signal; and a second diode joined between said control signal input and a coil of a second double pole double throw relay, said diode being biased against said negative control signal;

said coils of said first and second double pole double throw relays joined to ground and causing said switch portions to close on receipt of an appropriate said control signal thereby activating said switch portions.

16. A device as in claim 10 further comprising an isolator joined to said calibration signal generator to isolate said generator from ground.

17. A device as in claim 16 wherein said isolator is an opto-isolator having calibration on control signal inputs and an isolated output joined to said calibration signal generator, said isolated output providing an activation signal.

18. A device as in claim 17 further comprising:

an impedance buffer having a non-inverting input, an inverting input and a buffer output, one said input joined to said calibration isolated output, and said buffer output joined the other input; and at least one switch joined to said buffer output to enable said calibration signal generator on receipt of said activation signal from said buffer output.

* * * * *